US009253419B2

(12) United States Patent
Munro et al.

(10) Patent No.: US 9,253,419 B2
(45) Date of Patent: Feb. 2, 2016

(54) SYSTEM AND METHOD FOR OPTICAL IMAGING WITH VERTICAL CAVITY SURFACE EMITTING LASERS

(75) Inventors: Elizabeth Alice Munro, Toronto (CA); Ofer Levi, Los Altos, CA (US)

(73) Assignee: THE GOVERNING COUNCIL OF THE UNIVERSITY OF TORONTO, Toronto, Ontario (CA)

( * ) Notice: Subject to any disclaimer, the term of this patent is extended or adjusted under 35 U.S.C. 154(b) by 783 days.

(21) Appl. No.: 13/357,070

(22) Filed: Jan. 24, 2012

(65) Prior Publication Data

US 2012/0188354 A1 Jul. 26, 2012

Related U.S. Application Data

(60) Provisional application No. 61/435,453, filed on Jan. 24, 2011.

(51) Int. Cl.
*H04N 5/232* (2006.01)
*H04N 5/33* (2006.01)
*H04N 5/225* (2006.01)

(52) U.S. Cl.
CPC ............. *H04N 5/332* (2013.01); *H04N 5/2256* (2013.01)

(58) Field of Classification Search
CPC ... H04N 5/2256; H04N 5/332; H04N 1/0282; G02B 19/0052; G02B 19/0057
See application file for complete search history.

(56) References Cited

U.S. PATENT DOCUMENTS

| 5,774,487 A * | 6/1998 | Morgan | H01S 5/18308 372/45.01 |
| 8,270,058 B1 * | 9/2012 | Muenter | G01B 9/0209 351/200 |
| 8,582,109 B1 * | 11/2013 | Schmitt | G01B 9/02004 356/479 |

(Continued)

OTHER PUBLICATIONS

Kuan et al. "Adaptive restoration of images with speckle." Acoustics, Speech and Signal Processing, IEEE Transactions on, Mar. 1987, vol. 35, Issue 3, pp. 373-383.*

*Primary Examiner* — Thai Tran
*Assistant Examiner* — Stephen Smith
(74) *Attorney, Agent, or Firm* — Norton Rose Fulbright Canada LLP

(57) ABSTRACT

The present invention uses vertical-cavity surface-emitting lasers (VCSELs) as illumination source for simultaneous imaging of blood flow and tissue oxygenation dynamics in vivo, or a means to monitor neural activity in brain slices ex vivo. The speckle pattern on the brain tissue due to a VCSEL's coherence properties is the main challenge to producing low-noise high-brightness illumination, required for evaluating tissue oxygenation. Moreover, using oxide-confined VCSELs we show a fast switching from a single-mode operation scheme to a special multi-modal, multi-wavelength rapid sweep scheme. The multi-modal, multi-wavelength rapid sweep scheme reduces noise values to within a factor of 40% compared to non-coherent LED illumination, enabling high-brightness VCSELs to act as efficient miniature light sources for various brain imaging modalities and other imaging applications. These VCSELs are promising for long-term portable continuous monitoring of brain dynamics in freely moving animals.

20 Claims, 12 Drawing Sheets

(56) References Cited

U.S. PATENT DOCUMENTS

| | | | | |
|---|---|---|---|---|
| 2005/0043606 A1* | 2/2005 | Pewzner | A61B 5/0261 | 600/407 |
| 2005/0073690 A1* | 4/2005 | Abbink | G01J 9/02 | 356/451 |
| 2005/0147135 A1* | 7/2005 | Kurtz | H04N 9/3161 | 372/23 |
| 2007/0263226 A1* | 11/2007 | Kurtz | A61B 5/0059 | 356/492 |
| 2009/0097522 A1* | 4/2009 | Justice | H01S 5/18386 | 372/50.11 |
| 2009/0118622 A1* | 5/2009 | Durkin | A61B 5/0073 | 600/473 |
| 2010/0152591 A1* | 6/2010 | Yu | A61B 5/14551 | 600/481 |
| 2011/0032957 A1* | 2/2011 | Cable | H01S 5/141 | 372/20 |
| 2011/0096390 A1* | 4/2011 | Hempstead | G02B 27/48 | 359/326 |
| 2012/0026503 A1* | 2/2012 | Lewandowski | G01N 21/4795 | 356/477 |
| 2012/0080411 A1* | 4/2012 | Mizuyama | G02B 27/48 | 219/121.6 |
| 2012/0277559 A1* | 11/2012 | Kohl-Bareis | A61B 5/0261 | 600/324 |
| 2013/0003343 A1* | 1/2013 | Sudarshanam | G02B 27/48 | 362/19 |

* cited by examiner

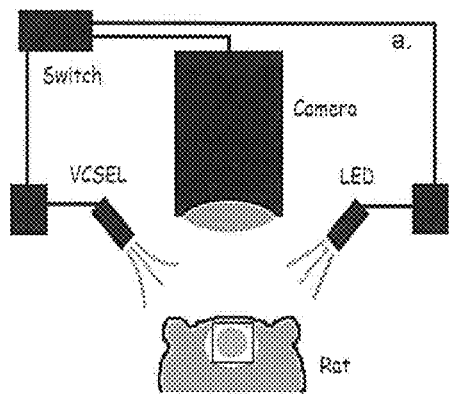
FIG. 2(a)
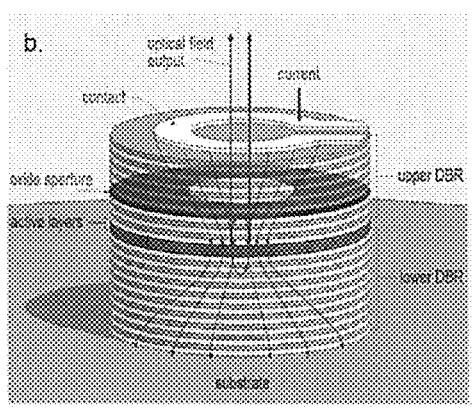
FIG. 2(b)
FIG. 2(d)
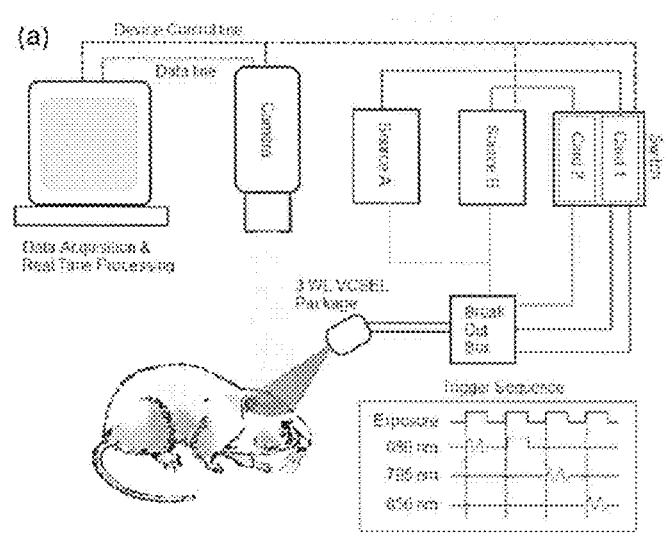
FIG. 2(c)
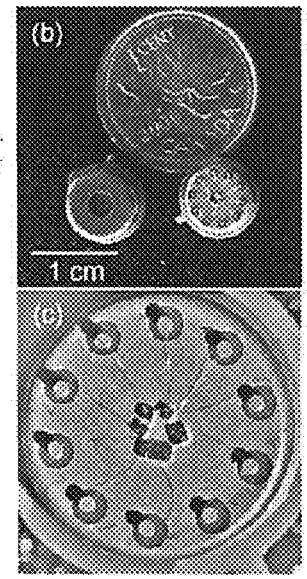
FIG. 2(e)

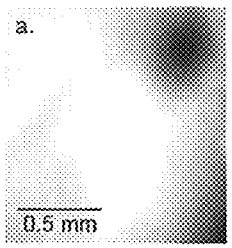
FIG. 5(a)
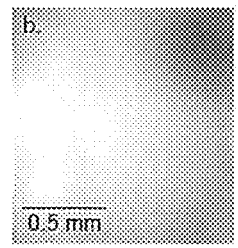
FIG. 5(b)
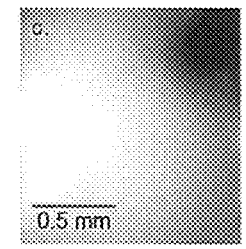
FIG. 5(c)
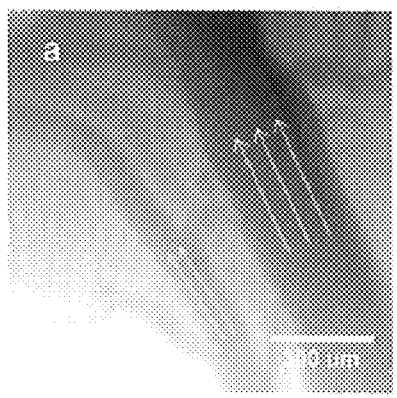
FIG. 5(d)
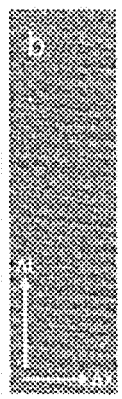
FIG. 5(e)
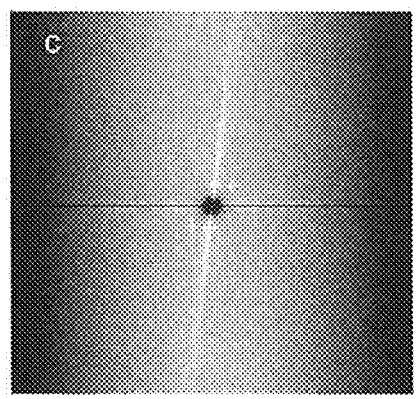
FIG. 5(f)
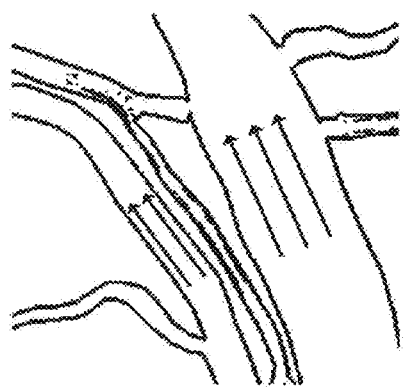
FIG. 5(d.1)

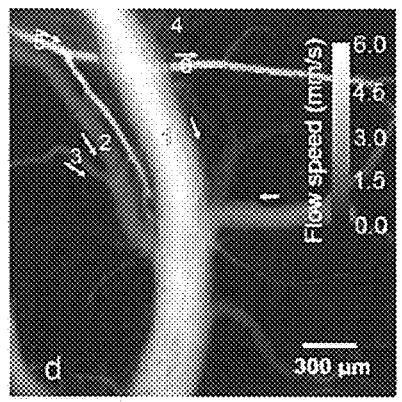
FIG. 5(g)
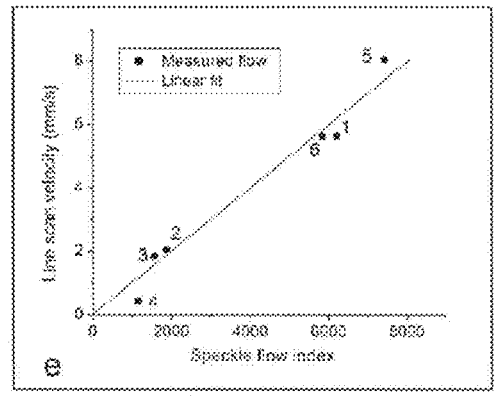
FIG. 5(h)
FIG. 5(i)
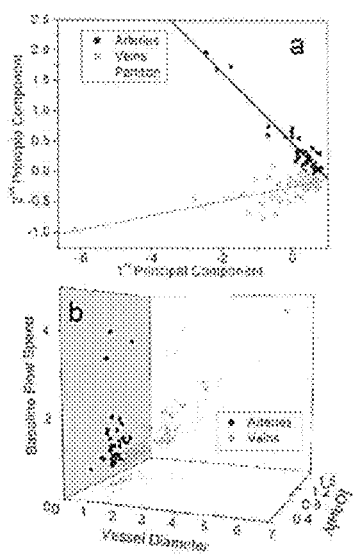
FIG. 5(j)
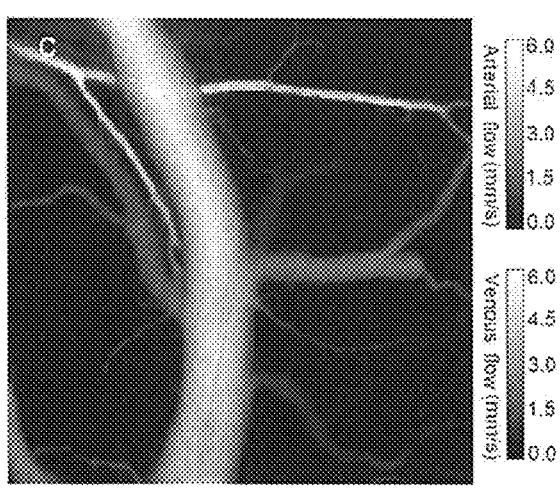
FIG. 5(k)

SYSTEM AND METHOD FOR OPTICAL IMAGING WITH VERTICAL CAVITY SURFACE EMITTING LASERS

CROSS-REFERENCE TO RELATED APPLICATIONS

The present application, claims the benefit under 35 U.S.C. §119(e) of U.S. Provisional Application Ser. No. 61/435,453 filed on Jan. 24, 2011, titled "SYSTEM AND METHOD FOR OPTICAL IMAGING WITH VERTICAL CAVITY SURFACE EMITTING LASERS", the entirety of which is hereby incorporated by reference.

FIELD OF THE INVENTION

This invention relates generally to optical imaging technologies. This invention relates more particularly to intrinsic optical signal imaging devices and methods.

BACKGROUND OF THE INVENTION

Current biomedical imaging modalities, including functional magnetic resonance imaging, computed tomography scan, and positron emission tomography, are mature imaging technologies that produce useful data for medical diagnostics and basic biomedical research. However, these technologies generally require the subject to be scanned to be immobile. For adult human subjects, this is easily achieved. However, in infants or animal models, immobilization often requires the use of a sedative or anaesthetic. Due to the negative physiological effects of these drugs, especially in immunocompromised subjects, frequent imaging can have physiologically detrimental or even fatal consequences. The desire to take frequent or continuous images in unanaesthetized subjects is especially pronounced in basic biomedical research, where multiple time points in an imaging series could be used to identify modes of disease progression, drug efficacy, or responses to particular stimuli. The usefulness of a continuous imaging modality in a clinical setting is also undeniable, as it could be used to create personalized treatment plans based on up-to-the-minute disease progression and drug efficacy monitoring.

Therefore there is a need for imaging technologies that enable the generation of useful imaging series, but that do not require that the subject be immobile during scanning.

Another common but widely accepted problem with prior art imaging devices is their size and significant cost (hardware, software, and associated support and training costs). Also, due to bulky, fixed implementation, subjects must be brought to the device—it cannot be brought to them. This limits the applications of optical imaging technologies.

Thus, there is a need for a lower cost, portable, optical imaging system that is operable to generate useful imaging series, and can be applied to a variety of subjects, including in health care and biomedical research settings.

Yet another problem is the need to use different imaging modalities in order to enable capture of different types of images and a series of images captured over time for making a required diagnosis. Performing multiple scans in series using different imaging modalities can significantly increase the time and costs for performing scans for a given subject.

Lasers have been used as effective and cost efficient light sources for optical imaging applications, such as for example VCSELs (vertical-cavity surface-emitting lasers). VCSELs in particular are relatively small and cost effective. Lasers, however, introduce coherence effect noise (random constructive/destructive interference) which superimpose a speckle pattern over the signal, and thereby prevent generation of low-noise, high-brightness illuminations, which are required for example for evaluating tissue oxygenation in neural imaging.

Therefore, there is a need for a technology and solution that addresses at least some of the limitations as outlined above.

SUMMARY OF THE INVENTION

In a first aspect of the invention, an optical imaging system is operable to alternate the operation of at least one multi-modal, multi-wavelength laser light source between at least two different modalities, such as intrinsic optical signal imaging (IOSI) and laser speckle contrast imaging (LSCI), thereby enabling the reduction of spatial noise and temporal noise in resulting capture images.

In another aspect of the invention, a novel optical imaging scheme for use in conjunction with laser light sources is provided, that includes alternating the light source(s) between a single mode and a multi-modal, multi-wavelength current sweep mode, thereby enabling the manipulation of speckle noise properties or coherence effects of captured images.

In another aspect of the invention, a method of capturing images using a laser as a light source is provided including the steps of: (a) initiating a multi-modal laser light source to illuminate a subject, (b) alternating the operation of the laser light source rapidly between multi-wavelength current sweep modes, (c) capturing images of the subject multi-modes so as to generate multiple sets of images, and (d) processing the multiple, sets of images so as to generate new, images with reduced spatial and temporal noise characteristics.

In a still other aspect of the invention, an image capture device or camera having a lens component that is structured to enable the multi-modalmodal capture of images as described herein.

BRIEF DESCRIPTION OF THE DRAWINGS

FIGS. 2(a)-2(e) illustrate representative implementations of the present invention. FIG. 2(a) illustrates a multi-modal, VCSEL and LED system schematic, in accordance with an illustrative implementation. FIG. 2(b) illustrates a VCSEL structure in accordance with the present invention. FIG. 2(c) illustrates a multi-modal, multi-wavelength system schematic in accordance with an illustrative implementation. FIG. 2(d) shows a relative size comparison with a penny, and FIG. 2(e) shows a close up detail of an illustrative multi-modal, multi-wavelength VCSEL package.

FIG. 3(a) shows mode profiles for various individual current injection values to the VCSEL. FIG. 3(b) illustrates the current sweep (CW) mode, which integrates the transverse modes over each camera exposure time, to produce a uniform intensity pattern and reduced coherence.

FIG. 4(a) shows a VCSEL spectral analysis showing narrow single mode (SM), shifted multi mode (MM) and widened current sweep (SW) spectra. The FWHM spectral width values are indicated inside FIG. 4(a). FIG. 4(b) shows a measured interferogram envelope for SM VCSEL operation (black), showing characteristically long coherence length. In comparison, the measured envelopes for MM (green) and SW (red) operations are shown. FIG. 4(c) shows a measured interferogram envelope for SW operation, in smaller path difference range. FIGS. 4(d)-4(f) show various spectra for multi-wavelength—680 nm, 795 nm, and 850 nm—VCSELs in accordance with an illustrative implementation. FIG. 4(g) shows interferogram results for the three wavelengths' SW operation, and FIG. 4(h) shows VCSEL SM stability near threshold.

FIGS. 5(a)-5(k) show illustrative examples of the present system and method. FIGS. 5(a)-5(c) consist of raw images of rat cortex, focused 600 microns below the surface. FIG. 5 (a) shows the LED illumination; FIG. 5(b) shows the VCSEL illumination in SW mode, where the illumination is uniform and there is minimal noise; and FIG. 5(c) shows the VCSEL illumination in SM mode. FIGS. 5(d)-5(f) show an illustrative implementation for cell tracking with line scans using spatiotemporal averaging. FIG. 5(d.1) is a line drawing outlining the features in the in vivo image of FIG. 5(d) for greater clarity. FIG. 5(g) shows an estimated flow speed map, based on LSCI image and calibration from a single vessel line scan. FIG. 5(h) shows a correlation graph between a speckle flow index and flow velocity established from line scan measurements on vessels 1-6 represented by dots plotted in the correlation graph. FIG. 5(i) shows a scatter plot of data projections on first two principal components, showing a partition estimate. FIG. 5(j) shows a 3D scatter plot showing vessel data against vessel diameter, baseline flow and speed and HbO changes. FIG. 5(k) shows a resulting vessel classification mapped onto a calibrated LSCI flow map.

FIG. 7(a) shows the results of an LED illumination. Noise values are low, and contrast largely highlights "edge effects" of image, rather than speckle variation. FIG. 7(b) shows the results for a SW illumination. Noise values are near those of the LED case. The speckle effects of the VCSEL are largely mitigated. FIG. 7(c) shows the results of a SM illumination. Coherence in the VCSEL is accentuated here, giving a large variance of contrast values due to cortical movement, with average noise values on the whole much higher than the LED and SM cases In FIG. 8(a) an LED illumination is shown having a low noise throughout. FIG. 8(b) shows the results of a current sweep (SW) mode illumination has noise levels near that of the LED, particularly on the cortical surface. In FIG. 8(c) a single mode (SM) illumination has noise levels an order of magnitude higher than the LED throughout.

FIG. 9(a) shows reflected intensity from a cortical region. A reflectivity change is observed when the spreading depression wave propagates. FIG. 9(b) shows a brain slice image, while a spreading depression wave is propagating. The small granularity in the image indicates the residual speckle interference pattern illumination.

FIG. 10(a) shows the percent change in reflected intensity (mainly due to deoxy-Hb) during SW operation. FIG. 10(b) shows the speckle contrast ratio values during SM operation. The blood vessels on the surface of the brain are easily observed, FIG. 10(c) shows the calculated percent change in CR values. An increase of the CR values in the blood vessels is observed, indicating a reduction in blood flow.

DETAILED DESCRIPTION

Figure 1:
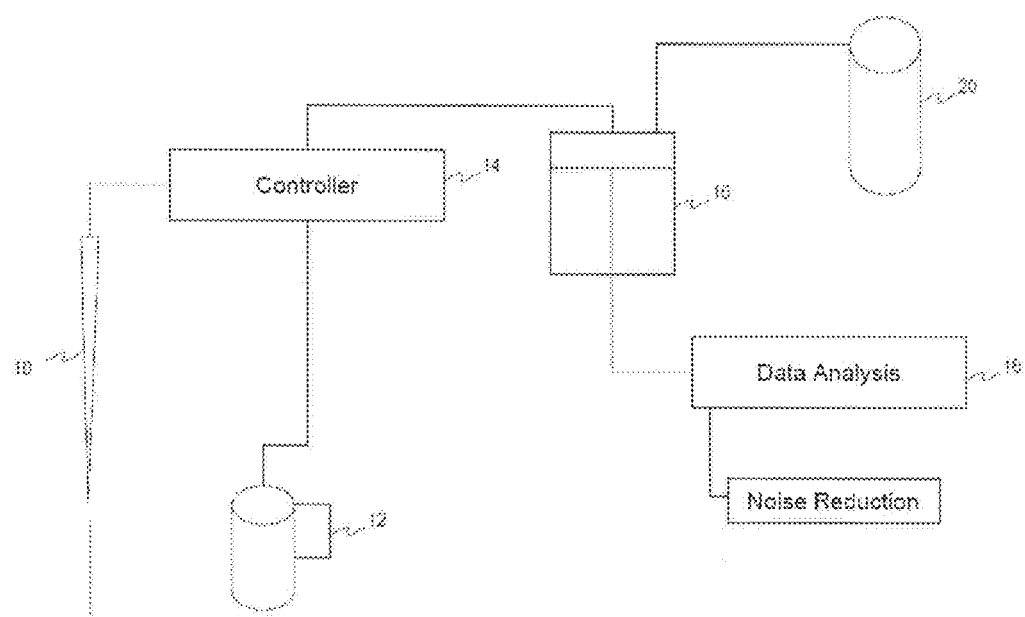
FIG. 1 is a system diagram illustrating the present invention.

One aspect of the invention is an optical imaging system that is operable to apply a multi-modal, multi-wavelength current sweep illumination operation or pattern to modulate a laser light source. The modulation using a multi-modal, multi-wavelength current sweep illumination operation enables the manipulation of coherence effects or speckle noise properties, if required.

Another aspect of the invention is an optical imaging system that is operable to alternate the operation of one or more laser light sources between at least two illumination patterns.

More particularly the system of the present invention consists of an optical imaging system that includes at least one laser light source and a controller, wherein the controller is operable to enable the modulation of the laser light source based on at least one current sweep illumination operation, and optionally in addition a single mode illumination operation.

The system of the present invention is operable to alternate the operation of a laser light source between a single illumination mode (or pattern) and a current sweep illumination (or pattern), thereby enabling the manipulation of speckle noise properties or coherence effects of captured images. This modulation of the laser light source through mode mixing enables the reduction of spatial and temporal noise in IOS images, as further explained below.

In a particular aspect of the invention, the laser light source is a multi-modal, multi-wavelength vertical-cavity surface-emitting laser, or VCSEL, and the system of the present invention is operable to alternate the operation of the VCSEL between multi-modal, multi-wavelength current sweep modes, which enables the temporal noise and spatial noise for the captured images to be decreased to values comparable to those for images captured using a low noise LED.

It should be understood that the present invention refers a number of times to use of multi-modal, multi-wavelength VCSELs as a light source, however, other laser light sources may be used provided that they can generate the dynamic range required for useful image capture according to the technique described, as will be obvious to a person skilled in the art. It is advantageous of course, if another laser light source is used, to use another laser device that is also relatively small and cost effective.

Another aspect of the invention is an image capture device or camera having a lens component that is structured to enable the multi-modal capture of images as described herein. The image capture device according to the present invention is described in greater detail under the heading "Implementation" below, and also is shown in FIG. 2(a).

In another aspect, of the invention, a method of capturing images of a subject is provided comprising the steps of: (a) initiating a laser light source to illuminate a subject, (b) operating the laser light source in a current sweep illumination pattern, and (c) capturing a series of images illuminated by the laser light source using an image capture-device, whereby the resulting images enable the manipulation of coherence effects or noise properties.

In another aspect of the invention, a method of capturing images of a subject including the steps of: (a) initiating a laser light source to illuminate a subject, (b) operating the laser light source in one or more current sweep illumination patterns, and also optionally in one or more single mode illumination patterns, and alternating between the illumination patterns rapidly, and (c) capturing images of the subject in the illumination patterns so as to generates a number of sets of images corresponding to the number of different illumination patterns, and (d) processing the sets of images to generate a set of output images, including by incorporating into the output images selected aspects of the different sets of images, including whereby the output images have reduced spatial and temporal noise characteristics. The first set of images and the second set of images can also be analyzed using separate image processing routines.

In a particular implementation of the invention, the mode mixing or illumination pattern mixing approach of the present invention enables the use of a single image capture device to capture images in multiple modes or using multiple illumination patterns, for targeting different measurements while avoiding the added complexity of image acquisition using multiple image capture devices. As explained below, the present invention contemplates the use of a single laser light source, operated in this multi-modal scheme disclosed herein, or two or more small laser light sources disposed in close proximity one another.

In an embodiment, the multi-modal, multi-wavelength control of the VCSEL produces the decrease in temporal and spatial noise through the combined effect of decreasing the coherence length of the light source, along with spatial and polarization superposition of transverse modes that change in space and time.

As best shown in FIG. 1, the system includes a light source (10), an image capture device such as a detector or detector array or camera (12), and a controller (14) that is linked to the light source (10) and to the image capture device (14). The light source includes at least one illuminating device suitable to provide sufficient illumination of the subject to reveal a sub-surface layer of the subject, such as for example illuminating a skull or illuminating the brain when the skull is removed and replaced by an optical window for imaging a layer of the underlying brain tissue. Other applications of the invention outside of brain imaging are possible, as discussed under the heading "Applications".

The system may also include a computer (16) that includes a data analysis component (18S) that is further explained below.

The light source includes at least one laser. In a particular implementation the laser is a VCSEL because of its characteristics described herein. The light source is selected and configured in order to provide sufficient illumination for a subject.

It should be understood that the present invention contemplates the modulation of single laser between two different modalities, and also the use of two aligned lasers, one having a first modality, and the other having a second modality, in one possible implementation of a multi-laser, multi-modal aspect of this invention. So long as the lasers are relatively small, this double light source configuration still provides good results.

The controller (14) is linked to a controller program or embodies control instructions. In the present invention, the controller is operable to reduce the coherence effects and thereby reduce spatial and temporal noise in the capture images, thereby improving the quality of the capture images. The controller therefore includes or is linked to a noise reduction component.

In accordance with the present invention, spatial noise (i.e. speckle pattern) and temporal noise (fluctuations in intensity) is reduced by temporally blending spatially varying speckle interference patterns (as operating current changes induce spatial change in transverse mode patterns) as well as polarization states, while imaging the subject.

In one implementation, the controller (14) is operable to drive the VCSEL in either a single mode regime, or to sweep from single to multimodal regimes with different corresponding speckle patterns using a sinusoidal current waveform.

In another implementation, the controller (14) is operable to drive the VCSEL in different multimode regimes, or to sweep from single to multimodal regimes with different corresponding speckle patterns using different current waveforms that change the relative dwell time in a given current (saw tooth or multiple square waveforms are examples) to create different weight to the modes that are mixed within the current sweep mode schemes.

In one aspect of the invention, the current is modulated so that an integer number of modulation cycles fit into the exposure time of the camera, which improves the result. This is because the camera integrates the varying laser modes (which change as the current is modulated) for the duration of time that the shutter is open (the exposure time). This is because in multimode operation, where the shutter may be open across multiple modes and therefore integrates the different modes, for a fixed shutter duration (or exposure time). There can be many options to the sum of the modes that differ in the total intensity in the image, depending on the timing between the shutter opening and the start of the modulation cycles. By fitting an integer number of modulation cycles within the camera exposure time, the total amount of intensity in the image always represents the same sum of laser modes, irrespective of the timing between the shutter opening and the start of the modulation cycles. This creates a benefit for minimizing the noise in using the current sweep mode as an incoherent light source: For this reason, in one aspect of the invention, the laser is modulated quickly so that a set of modulation cycles fit within a single image frame, in images captured in sequence based on the multi-modal method of the present invention. Explained otherwise, the rate of multi-modal modulation of the light source is adjusted to account for exposure time of the camera so that the multi-modal illuminations align with the operation of the camera.

The controller (14) is further operable to control the image capture device (12) to capture images with a finite exposure time and to superimpose the different speckle patterns (for example using time averaging) to reduce the overall speckle noise for the captured image. In an example of the use of this approach, in one implementation of the present invention, a set of images is captured at different sweep amplitudes and frequencies, and along a plurality of baseline sets such as for example: (A) emission of a single mode VCSEL, and (B) emission of a multimode VCSEL.

It is useful to explain how coherence effects are quantified. A common metric in measuring coherence effects is evaluating a coherence length. The coherence length $l_c$ of a laser source is associated with the spectral linewidth of the laser:

$$l_c = \frac{2\ln 2}{\pi} \frac{\lambda^2}{\Delta\lambda_{1/2}}$$

where $\lambda$ is the laser operating wavelength and $\Delta\lambda_{1/2}$ is the FWHM spectral width. The coherence length $l_c$ can be reduced by operating the laser in a multi-modal operating regime, where multiple transverse modes are supported and the spectral bandwidth is increased. This change in $l_c$ leads to a reduction in the speckle magnitude. When a surface is illuminated by light with separate wavelength components to create M uncorrelated speckle patterns, they will add on an irradiance basis to reduce the speckle contrast magnitude by $1/\sqrt{M}$. Also, speckle magnitude can be further reduced by cycling between different multi-modal slates (mode sweep), while keeping a longer integration time in the image capture device.

In accordance with another aspect of the present invention, the light source (10) includes (A) at least one VCSEL (16), and may also include (B) an alternate light source such as an LED (18). The controller is linked to the light source (10) and to the camera (12) so as to alternate the illumination of the subject in every frame between the VCSEL and the alternate light source. This aspect is further explained below.

The system of the present invention is implemented as a rapid image recording system that is operable to capture images in the multiple modes, and enabling a range of measurements of a subject using a relatively simple, cost effective and portable system. As further shown in FIG. 1, the system may include or be linked to an image analysis component (20) that may include or embody one more image analysis routines, which may embody known image analysis algorithms. Different analysis routines are used generate for example in neural imaging different neural tissue maps which are then associated to uncover information in combination. More specifically, using the technology of the present invention, images may be captured in the two modes and then analyzed using the image analysis component to generate both tissue oxygenation (OISI) maps and blood flow (LCSI) maps.

It is noted that the system of the present invention may be used to create only one such map, for example in the example provided above, an OISI map or an LCSI map.

Example of Implementation

The invention is further explained by reference to an example of an implementation thereof. The results indicated below are based on use of the example implementation.

In one implementation, oxide-confined VCSELs are used, which are available commercially, and provide wavelengths as low as 670 nm, power levels in excess of 1 mwatt, a circular beam shape, low noise, over a GHz modulation bandwidth, and good control of the mode shape and optical beam properties. Such VCSELs are stable and have low values of relative intensity noise (RIN). Power efficiency, small size, and low operating currents of VCSELs. (~few mA) minimize the required operating power, and heat dissipation requirements, further improving the suitability of VCSELs attractive for optical imaging applications.

The VCSEL may be powered by a Keithley 6221 current source, with waveform capability. A silica-based tissue phantom may be used as a uniform reflecting surface, to allow evaluation and optimization of the imaging systems before applying it to live brain tissues. A Retiga 4000R 12-bit greyscale CCD camera fitted with a pair of Nikon 50 mm f/1.4 lenses may be used as the image capture device. The images are stored to a computer linked to the camera.

It should be understood that the camera should have sufficient dynamic range. The improvement of the overall system may improve with the use of a better camera.

In the implementation illustrated in FIG. 2(a) a CCD camera utilizes two identical camera lenses to maintain one-to-one magnification. The controller is implemented as a switch trigger-linked to the camera to alternate the illumination source every frame between an LED and a VCSEL. In FIG. 2(b), a cross-section schematic of a VCSEL in accordance with the present invention is shown cross section schematic of a VCSEL, where the effect of oxide aperture to confine the current inside the cavity is illustrated.

The CCD camera is used for imaging the inspected surface (i.e. opal glass, mouse brain tissue, live rat brain), while LED (625 nm) and VCSEL (670 nm) light sources in various operating modes are used for illumination. Both opal glass and brain tissue images were processed to retrieve temporal noise and spatial contrast data values.

As mentioned earlier, a cross section schematic of a VCSEL is shown in FIG. 2(b). The backscattered light is collected using a 1:1 magnification with two identical lenses (Nikon, F=50 mm, F/1.4) into the CCD camera for opal glass and live rat brain imaging studies. The camera was mounted on a vertical translation stage, allowing adjustment of the focal plane height. The imaged field of view was 7.6×7.6 mm. Slice imaging for mouse brain tissue slices was conducted through a microscope (BX51, Olympus, Japan) with low magnification objective (XLFluor 4×/340, ×4 magnification, NA 0.28).

In order to quantify noise difference between coherent and incoherent light sources, a novel switching system is provided that allows for simultaneous image acquisition using these two different light sources. For example, LED and VCSEL illumination of the brain tissues were applied in an alternating sequence, through use of a fast switch (model 7001, Keithley, Cleveland, Ohio). Control of the VCSEL with a low noise current source (model 6221, Keithley, Cleveland, Ohio) allowed for excitation of several different laser operation schemes, each of which was compared directly to LED illumination. The CCD camera (Retiga 4000R, QImaging, Surrey, BC) was triggered to collect 1024×1024 pixel, 12 bit images at 8 Hz, in synchronization with the source alternation. Following image sequence recording, the images are processed to retrieve temporal noise values and spatial statistics of speckle patterns. The resulting speckle contrast values can also be used to calculate speckle correlation times, and relative flow velocities.

Illumination Schemes

LED (625,nm) illumination may be driven for example with a 50 mA DC current. VCSEL illumination was controlled in three radiation patterns. Modes emitted from a circularly symmetric VCSEL structures closely resemble the profiles of the Laguerre-Gaussian mode family. For single mode operation (SM), the laser was driven near threshold current at 5-6 mA. In this operation scheme, only the fundamental LP01 mode is excited, and the beam has a nearly Gaussian special profile. For multi mode operation (MM), the laser may be driven near peak output at 14.5 mA. Here, more modes are excited and the beam is seen to take on the characteristic 'donut'.shape associated with higher order cylindrical modes. For sweep mode operation (SW), the laser may be driven with a 10 kHz sinusoidal input current ranging between 7 and 14.5 mA, inducing a rapid temporal superposition of the emitted transverse laser modes. In some studies, MM illumination coherence was further reduced by diverging the VCSEL beam through the use of ground glass diffusers. A single 20 degrees diffuser scheme was implemented, as well as a doublet combination of a 20 degree and a 50 degree diffuser, located on the beam path from the VCSEL to the tissue, close to the VCSEL.

Image Analysis

For temporal analysis in live rat brains, in one example 1000 images were taken with each VCSEL illumination scheme (i.e. SM, MM, SW) and compared to 1000 corresponding LED images, for n=7 rats. 400 evenly spaced pixels from a 100×100 pixel grid were taken as a representative data sample for analysis. Over the 1000 image sequence, the standard deviation/mean ratio was calculated on a per pixel basis. For each rat, the mean representative pixel value was recorded, and the variation in values was used to ensure statistical anomalies associated with outliers were mitigated. A similar analysis was repeated in all cases on the opal glass, with n=5 trials and with brain slices with n=5 trials.

For n=1 rat, a further temporal analysis experiment was conducted on trial repeated data to investigate the performance enhancement capabilities of trial averaging in vivo. In this case, sets of 256 images were taken with each illumination source. Repeated 64 set trials were taken, and then combined to create a single set of 256 supercell images, for each of SM, SW and LED illumination schemes. For each source, standard deviation/mean maps were produced of the whole image for both the single trial case and for the 64 trial average.

Spatial noise analysis was conducted on individual images in all illumination schemes. Within a single frame, standard deviation/mean calculations may be used over a moving 5×5 pixels region of interest (ROI), centered sequentially at each pixel of the image. The resulting spatial contrast map may then be averaged for example over 40 images to obtain a short time scale statistical average. Contrast values were then averaged over the cortical imaging region to obtain the average spatial noise value.

Coherence Length Evaluation

The coherence length values for VCSEL and LED illumination were used to gain further understanding of the VCSEL operating mode effects on laser speckle. Emission spectra for a 670 nm VCSEL using the SM, MM and SW illumination schemes, as well as for a 625 nm LED illumination were measured with an optical spectrum analyzer (OSA), and the FWHM spectral width values were estimated from these spectra. From these values, coherence length was calculated for each illumination scheme, and was compared to direct measurement of the coherence length using a Michelson interferometer (Ealing-Beck, Watford, England).

Comparison to Opal Diffusing Glass

Opal diffusing glass (50 mm square, Edmund Optics, Barrington, N.J., USA) was used for assessment of noise values and spatial statistics of speckle patterns from a known stationary imaging surface. These values can be used to discern how the speckle pattern itself varies between light sources and between the various VCSEL operating modes, while mitigating temporal effects, to isolate some of the noise sources present in vivo.

Results

Transverse mode behavior for VCSELs and the coherence length values for VCSEL and LED illumination was evaluated to demonstrate the effects that VCSEL operating modes have on laser speckle and to show the advantages of the novel illumination scheme described in this disclosure, which provides significantly reduced noise values, comparable to LED illumination for IOSI brain imaging. The properties of single mode VCSEL operation scheme (SM) were evaluated for laser speckle contrast imaging (LCSI) brain imaging.

VCSEL Transverse Mode Analysis

VCSEL structure confines the field within a very short laser cavity, between two stacks of distributed bragg reflector (DBR) mirrors as shown schematically in FIG. 2(b). The short cavity length (typically 5-10 µm) supports only one longitudinal mode, while either a transverse single mode or multimode operation is possible, depending on the VCSEL structure design.

Figure 3:
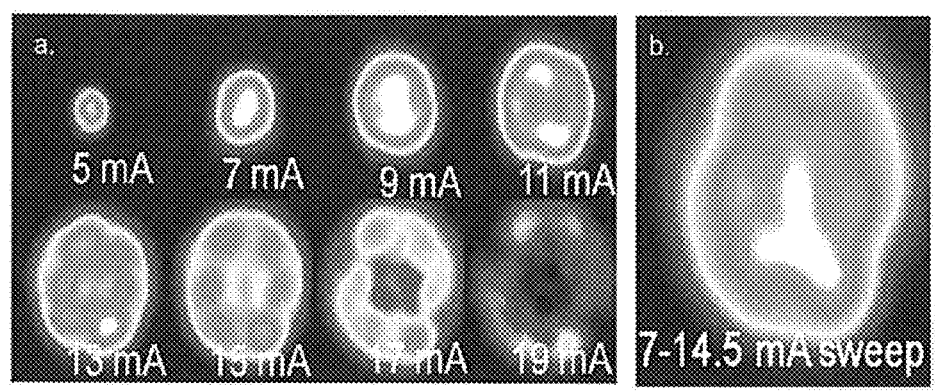
FIGS. 3(a) and 3(b) show far field intensity mode patterns for a VCSEL.

FIG. 3 shows far field intensity mode patterns for a VCSEL in accordance with the present invention. FIG. 3(a) illustrates mode profiles for various individual current injection values to the VCSEL. FIG. 3(b) illustrates a current sweep (SW mode) that integrates the transverse modes over each camera exposure time, to produce a uniform intensity pattern and reduced coherence.

In low current values nearby the laser threshold (~5-6 mA), a fundamental transverse mode shape is observed. While this fundamental mode (SM) is sometimes hard to achieve in VCSELs with a large oxide-aperture (10-12 µm), such as the VCSELs referenced in this disclosure, locating the oxide aperture higher in the top DBR stack of the VCSEL cavity (as shown in FIG. 2(b), and explaining the operation of the novel lens design disclosed herein) allows such mode shape, in the expense of higher threshold current and lower peak power. Increasing the current, an onset of higher azimuthal order, donut-shaped transverse mode for high currents is initiated by fundamental mode spatial hole burning and thermally induced waveguiding effects. Furthermore, increasing current values above ~15 mA, a typical rollover of the output power characteristics in observed as well. FIG. 3(b) shows the current sweep operation scheme (SW) where rapid current sweep, introduce a temporal mixing of the laser modes shown in (a), to be observed in each camera frame as a more uniform beam profile, with reduced coherence. Importantly, the ability to obtain both a SM and SW schemes in the same VCSEL, with reasonable power output is a key step in using it as an illumination source simultaneously for both LCSI and IOSI, using one camera and rapid switching of the illumination patterns.

Coherence Length Evaluation

Figure 4A:
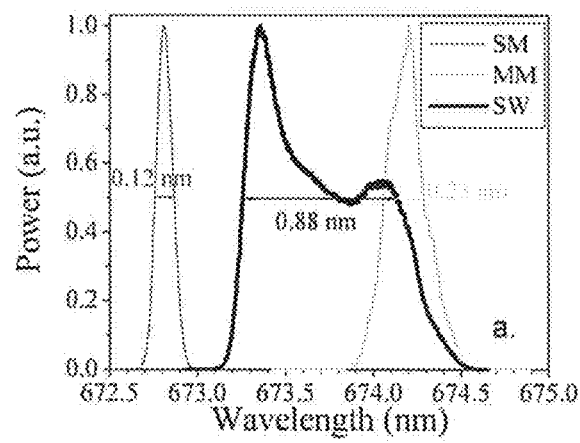
FIGS. 4(a)-4(h) show the results of spectral analysis of VCSEL operation in various embodiments.
Figure 4B:
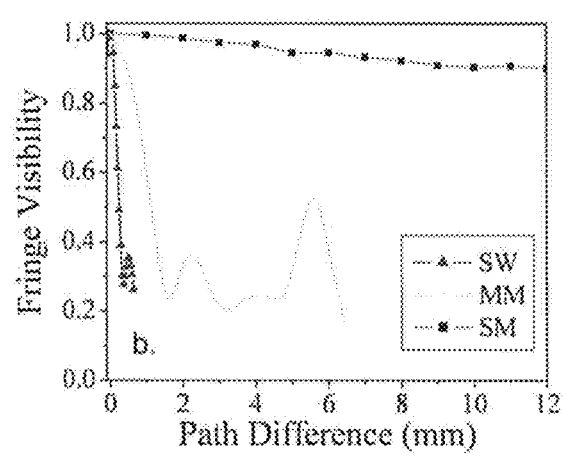
Figure 4C:
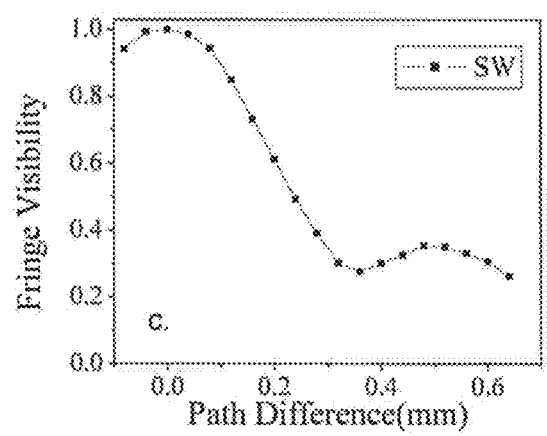
Figure 4:
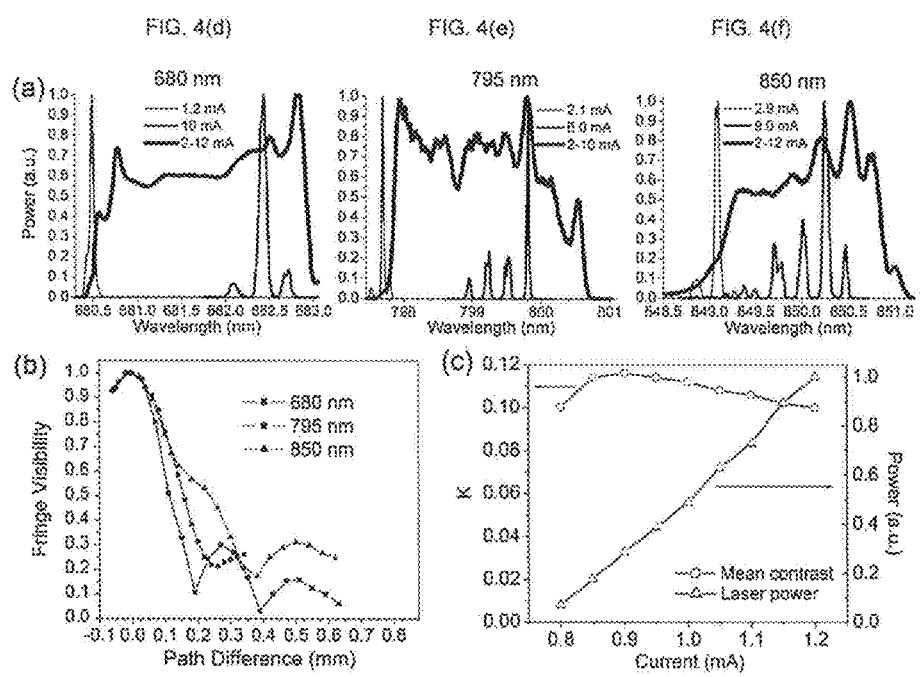

FIG. 4 shows spectral analysis results for VCSEL. In FIG. 4(a) single mode (SM) is indicated by a spectral line (red); somewhat wider multi mode (MM) spectrum (green); the significantly wider spectral distribution associated with current sweep (SW) mode (black). FIG. 4(b) shows measured coherence length for single mode VCSEL (black). in comparison, the measured coherence lengths for multi-mode (dotted, green) and sweep mode (dashed, red) operations are shown. FIG. 4(c) indicates measured coherence length for current sweep (SW) mode.

FIG. 4(a) shows the emission spectra for a 670 nm oxide-confined VCSEL at various VCSEL transverse modes with current values of 5 mA (SM), 14.5 mA (MM) and sweeping the current rapidly between 7 and 14.5 mA (SW). The spectral broadening is observed in MM operation mode. The thermal wavelength shift is mainly governed by change of the average index of refraction of the resonator, in a short VCSEL cavity. The mode spectral shift $\partial\lambda/\partial T \approx 0.06$ nm/K can be used to estimate the internal temperature increase. The spectral broadening observed in SW mode, is due to temporal integration of all the spectral components of the modes within this current sweep range in a rapid current sweep (~10 KHz). Utilizing the equation disclosed above in relation to coherence effects, coherence lengths for each mode are estimated from the spectral full width half max (FWHM) values. FIG. 4(b) show a comparison of the measured values for the coherence length, $l_c$ in SM, MM, SW operation schemes. The greatly reduced coherence length can be easily observed for the MM and SW operation schemes. Shown in FIG. 4(c) is the measured coherence length, $l_c$ For a SW VCSEL operation scheme. The calculated $l_c$=0.23 mm, is in an excellent agreement with the measured l value of 0.24 mm. These short coherence length values are not as low as the values obtained in an LED ($l_c$~9 µm, $\Delta\lambda$~20 nm) but are sufficiently low to greatly reduce temporal noise and spatial statistics of the speckle pattern in SW operation scheme, as will be shown below. The spectral width of a VCSEL at a SM operation in FIG. 4(a) is greatly overestimated from the expected ~100

MHz to ~0.1 nm due to the limited spectral resolution of the OSA. Fitting $l_c$ for SM operation, based on measure $l_c$ values yields over 50 mm, more than sufficient for evaluating flow using the LCSI technique in brain tissues. Importantly, the change between the high coherence SM and the low coherence SW rapid current sweep operating schemes can be done very rapidly, in few microseconds; enabling simultaneous portable intrinsic optical signal imaging (IOSI) and laser speckle contrast imaging (LSCI), using multi-modal, multi-wavelength VCSEL light sources.

As another example, illustrative spectra for a multi-modal, multi-wavelength VCSEL device having three wavelengths (680 nm, 795 nm, and 850 nm) are shown in FIGS. 4(d)-4(f). The spectra were measured with SM (at threshold current), MM (peak power), and optimized SW (current sweep) operation schemes. SW spectral widths were used to predict the coherence lengths using the following equation:

$$l_c = \frac{2\ln 2}{\pi} \frac{\lambda^2}{\Delta\lambda_{1/2}}$$

where $l_c$ is the coherence length, $\lambda$ is the laser operating wavelength and $\Delta\lambda_{1/2}$ is the FWHM spectral width.

For verification of the reduced coherence, a Michelson interferometer was used to measure the coherence lengths of each device under SW operation. The resulting data were used to estimate the expected contrast reduction in tissue.

The MM operation currents were determined based on the maximum power levels of each wavelength, while SW operation currents covered the range from threshold to somewhat above peak power. Spectra in the SM case are seen to be narrower than 0.04 nm, and the results shown here are most likely limited by OSA resolution rather than the spectra themselves. For MM operation, a wavelength shift can be seen, as well as the appearance of higher order side bands. For each wavelength, a similar effect is seen in the application of SW operation. The spectra are broadened to a width in the range of 2 nm, spanning the full range of available wavelengths. Interferogram results for the three wavelengths' SW operation are shown in FIG. 4(g). Similar results are seen in all three cases and coherence lengths are found to be in the range of 90-230 µm. If we use Monte Carlo simulated values of $\sigma_s$ in equation 4, we can estimate $n_s$ to be between 40 and 60, depending on wavelength, giving a speckle reduction of approximately 85%. Table 1, below, gives a comparison of the estimated coherence lengths from spectral measurements and interferometry, with all three wavelengths.

TABLE 1

Comparison of coherence lengths and resulting speckle pattern number for different VCSEL wavelengths

| Wavelength (nm) | Spectral width (nm) | $l_c$ (calculated) (µm) | $l_c$ (measured) (µm) | $\sigma_s$ (mm) | $n_s$ |
|---|---|---|---|---|---|
| 680 | 2.3 | 90 | 110 | 5.6 | 50 |
| 795 | 2.4 | 120 | 150 | 8.9 | 60 |
| 850 | 1.6 | 230 | 220 | 8.9 | 40 |

FIG. 4(h) shows VCSEL SM stability near threshold. We see that as power is ramped up, speckle contrast increases and then begins to decrease as higher order transverse modes begin to appear. Within this region, contrast is consistent within 15%, a level at which LSCI images may be obtained. This affords a range of powers covering an order of magnitude, within which we can consider emission to remain in single mode operation. This becomes important when trying to equalize image intensity between a number of VCSEL wavelengths, for each of which a detector may exhibit differing efficiency.

Temporal Noise and Spatial Speckle Statistics

To illustrate the operation of the invention, the noise values were compared as between three cases, namely (i) VCSEL illumination in single mode (SM) scheme; (ii) VCSEL illumination in sweep mode (SW) scheme; and (iii) LED operation, demonstrating that by applying the current sweep, coherence effects of a VCSEL can be reduced to produce noise levels similar to those of an LED. The results are shown in FIGS. 5(a)-5(c).

The influence of laser coherence on image granularity in the raw images of rat cortex, due to speckle formation is shown in FIG. 5(a) shows LED illumination, where little coherence is present and no speckle pattern is observed. FIG. 5(b) shows VCSEL illumination, in current sweep (SW) scheme, where the observed illumination pattern is uniform with minimal granularity. In comparison, in FIG. 5(c) VCSEL illumination is shown in single mode (SM) scheme. Much more noticeable levels of granularity due to the laser speckle pattern are evident.

Now referring to FIGS. 5(d)-5(f), LSCI itself cannot be used to establish flow direction and absolute speeds. However, applying speckle imaging in tandem with more traditional erythrocyte tracking can establish directional flow velocities. Due to the low absorption of NIR light in blood, signal intensity differences seen due to individual cells are quite low, making it difficult to easily track cells. Even in noisy data we have been able to implement cell tracking with line scans using spatiotemporal averaging. An outline of this procedure is shown in FIGS. 5(d)-5(f). To accomplish this, illumination at 680 nm in SW operation is used. Averaging, of three individual lasers is used to further decrease speckle noise. A series of line scan maps are taken along the length of a vessel at different points on the diameter. The temporal progression along each line is plotted, producing in each case a position-time plot, as shown in FIG. 5(e). Spatial filtering is used to remove any horizontal or vertical line artifacts which may be present. A 2-D FFT is calculated for each line scan image and these are then averaged. The resulting FFT distribution, shown in FIG. 5(f) shows a strong component with either negative or positive slope, corresponding to forward and backward flow. The angle of this component can be used to calculate flow speed. The speeds obtained from a few vessels in this manner can be used to calibrate subsequent LSCI maps. If we apply a long exposure limit model, which predicts blood flow to be inversely proportional to speckle contrast squared, a single calibrated vessel can be used to estimate absolute flow velocities throughout the whole LSCI map. FIG. 5(g) shows the calibrated flow map as estimated using line scans on the vessels indicated in FIG. 5(c). Line scans were performed on a total of six vessels for verification of the estimate.

A comparison between maximum flow speeds established from line scans and from speckle for each vessel is shown in FIG. 5(h), where speckle flow index is defined as $1/K^2$, with K being the local speckle contrast. The results show a strong correlation between speckle flow index and line scan velocity. Although direct quantification of errors has not been carried out for these studies, the model can be expected to remain quite accurate for a majority of vessels. Previous studies have shown that the long exposure limit is valid for a wide range of flow values. For vessels with very low flow, such as vessel 4, the long exposure condition breaks down and speeds may be over-estimated. For very high flow, the noise limit of the camera combined with effects from static scatterers may result in under-estimation of speeds.

With our imaging setup at 2× magnification, erythrocytes span approximately 1-2 pixels (~5-9 μm), and thus are quite difficult to resolve. In order to obtain a sufficient frame rate to track cells in vessels with speeds greater than ~4 mm/s, a reduced ROI is required. Rates of 110 FPS or higher can be achieved from a 200×200 ROI. Higher magnification can be used to facilitate this technique. The advantage of using this method for direction tracking, rather than velocity quantification, comes in our application to rapid imaging; we can determine flow direction by scanning a relatively small subset of vascular regions and extrapolating to connecting vessels. A direction map can then be produced for baseline flow, and the same data can be expected to remain unchanged during dynamic measurements. If a direction change did occur in a vessel, it would present itself first as a complete stopping of flow, before acceleration in the opposite direction. This type of anomalous behavior would be clearly seen from LSCI maps.

The initial estimate of vein and artery classification based on oxygenation changes was largely qualitative, and could only be applied to the largest vessels. In order to distinguish smaller vessels with better accuracy, a more detailed method is necessary. Using the data garnered from combining flow and oxygenation measurements, we are able to apply statistical methods to classify veins and arteries. In order to accomplish this, the image was first segmented to create a mask of individual vessel branches. The datasets obtained from ischemia and baseline measurements were used to produce five quantities for each vessel compartment: mean HbO concentration change, mean HbR concentration change, mean relative flow speed change, mean baseline flow, and mean vessel diameter. Before analysis, each quantity was normalized to its mean across all segments. Principle component analysis was performed on the resulting data to reduce dimensionality. The first principle component is interpreted to represent the large variability corresponding to vessel diameter, which sees similar variation in each type of vessel. The second component more closely indicates the differences between veins and arteries.

FIGS. 5($i$)-5($k$) show the results of the partition analysis. In order to separate veins and arteries, an iterative algorithm was used to perform two linear fits on an arbitrary partition, using the first two principal components of the dataset. A bisection of the two fitted lines was used to produce a new partition criterion and the fit was iterated on the new partitions until convergence was achieved [FIG. 5($i$)]. FIG. 5($j$) shows the resulting partition when plotted against the three parameters of vessel diameter, HbO concentration and baseline flow speed.

One clear inference is that while both veins and arteries show a correlation between vessel diameter and velocity, the slope of this correlation is higher in arteries—i.e., arteries of a given diameter tend to show higher velocities. Further, HbO concentrations tend to undergo a greater change in veins during ischemia. These observations are consistent with general understanding of neural hemodynamics and give confidence to the partition technique. FIG. 5($k$) shows the baseline flow map after vessel partitioning. The anatomical features observed further validate the partition. Vessel classifications are seen to be contiguous between branches, and the branching directions follow expected physiological conditions: arteries predominantly branch towards the midline (the bottom of the image), while veins branch outwards.

The present example illustrates a useful method for simultaneous imaging of cerebral blood flow and oxygenation using a compact light source. This technique can be applied to long-term monitoring, and may have important applications in study of stroke progression and recovery, as well as in evaluation of drugs and treatment for brain and disease therapy. With portable and continuous monitoring of hemodynamics, it is possible to obtain a better understanding of stroke conditions, such as periinfarct depolarizations (PIDs), and how they relate to flow changes in the ischemic penumbra. Understanding the relation between flow and metabolization in the ischemic core and penumbra is a key factor in determining the mechanism of cell death during stroke. In epilepsy, flow and oxygenation information can be used to understand the temporal precedence of metabolic changes.

Figure 6:
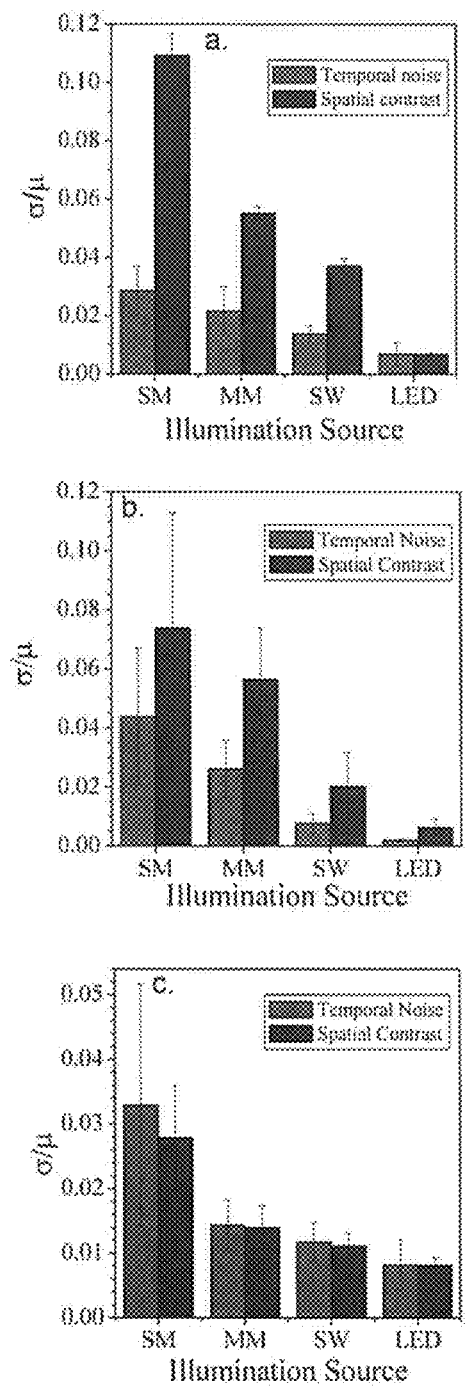
FIGS. 6(a)-6(c) show the temporal and spatial noise values associated with VCSEL illuminations (a) in opal glass, (b) in an Ex Vivo brain slice, and in (c) In Vivo, for n=7 rats. A significant decline in noise values is seen corresponding to decreasing laser coherence, bringing VCSEL noise near that of LED illumination.

The quantitative temporal and spatial noise data are summarized in FIG. 6 for stationary opal glass (a), Ex vivo mouse brain slice (b) and In vivo rat brains, for n=7 rats (c). There is a strong trend associated with the varying coherence properties of the illumination sources. The temporal noise in each case is reduced with reducing coherence. With LED illumination, both the temporal and spatial noise values are ~0.6%, in excellent agreement with the expected read noise and shot noise values for our 12 bit CCD camera, indicating no significant contribution to noise from coherence effects. In stationary opal glass, FIG. 6($a$) the spatial noise values are dominant, and the comparatively small temporal noise can be presumed to be due to slight vibrations. We note SM illumination gives the highest noise value, over 10%, while the shorter coherence length of SW illumination corresponds to a reduction in noise by a factor of ~2-3. The stationary stirface of opal glass can largely account for this. Speckle values undergo essentially no temporal variation on opal glass, and thus FIG. 6 shows the full range of interference intensities. In an Ex vivo cortical slices, FIG. 6($b$) a similar trend is observed, with the highest temporal noise values obtained from SM illumination and lower noise values by a factor of ~4-5 in SW illumination.

In vivo rat brain noise values are the most relevant to imaging studies of freely-behaving rodents. Therefore, we have repeated these evaluations for a larger set, n=7 rats to allow for a statistically significant analysis of the trends we saw. FIG. 6($c$) shows the summary of in vivo rat brain studies. The increased coherence length in SM illumination results in increased noise values, compared with SW and LED illumination, similar to the other cases analyzed. Importantly, the total temporal noise in SW illumination is increased (relatively) by 40% as compared to LED illumination, representing a very low noise increase due to coherence effects in SW illumination. Further analysis of the relative contribution of the coherence related noise as compared to shot noise+read noise was conducted by changing the F/ of the optical system between 1.4 and 2.8 show that the contribution of coherent effects was only 0.25-0.5% for this range of f/stop values, confirming that the relative contribution of coherence to the total noise is low, and that SW VCSEL illumination scheme is very effective in reducing these coherence effects in the images resulting in values within 40% of the optimal low noise LED illumination: Based on these observed values, we can infer that slight motion on the cranial surface in vivo allows us to benefit from some degree of speckle averaging over time. This is further supported by the fact that SM illumination benefits the most in vivo, while LED illumination sees virtually no difference between the two situations. We note that for MM operation (shown for comparison in FIG. 6($a$.-$c$.) the trend of reduced noise values with reduced coherence is preserved.

Alongside the temporal noise values, we plotted the corresponding in vivo spatial speckle pattern statistics data (blue). The results correlate strongly with the temporal case in all illumination schemes. The similarity between spatial and temporal values can be associated with slight movements on the cranial surface. In essence, the temporal noise is dominated by coherent elements varying along with small movements, in lieu of physiologically relevant optical signals. These same varying coherent elements are what we measure in spatial contrast calculations. We can further infer that speckle is indeed the largest source of noise difference between the LED and VCSEL cases. This effect shows up most clearly when we attempt a spatial analysis of a fixed speckle pattern, as shown in FIG. 6(a). Temporal fluctuations are not dominant and we can discern the powerful effect laser coherence has on noise.

Figure 7:
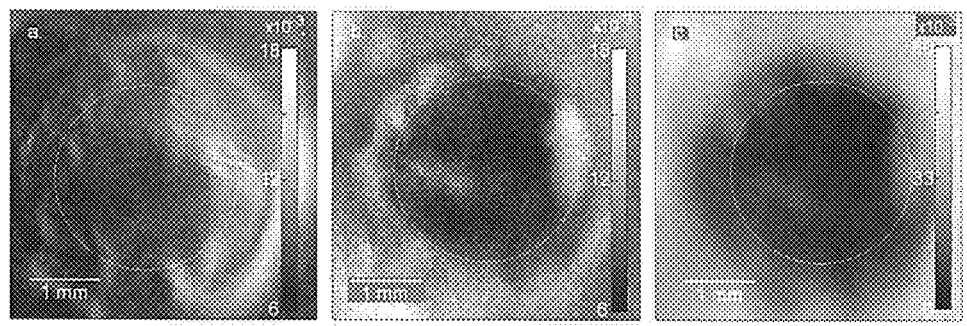
FIGS. 7(a)-7(c) show spatial noise maps based on image captures on a rat cortex.

A more qualitative account of the spatial contrast difference between the illumination schemes for in vivo rat brain can be obtained from the spatial noise maps given in FIG. 7.

The LED illumination scheme is shown in FIG. 7(a), in which we see characteristically low noise values, with highlights appearing largely due to high contrast values at dark/light edge features within a frame. As discussed above, the main contribution is due to shot noise and read noise values for the image. In FIG. 7(b) SW illumination is shown, in a similar intensity scale for comparison. Similar noise values are observed, but qualitatively we can infer that speckle effects can be observed in the image, but not large enough to pass the main contributions from the shot noise. SM illumination scheme is shown in FIG. 7(c), and it is evident that laser speckle contributes significantly higher noise values in this case. Although not in best focus, vascular shadowing on the cortical surface can be seen in a similar manner to images produced from LCSI techniques.

Figure 8:
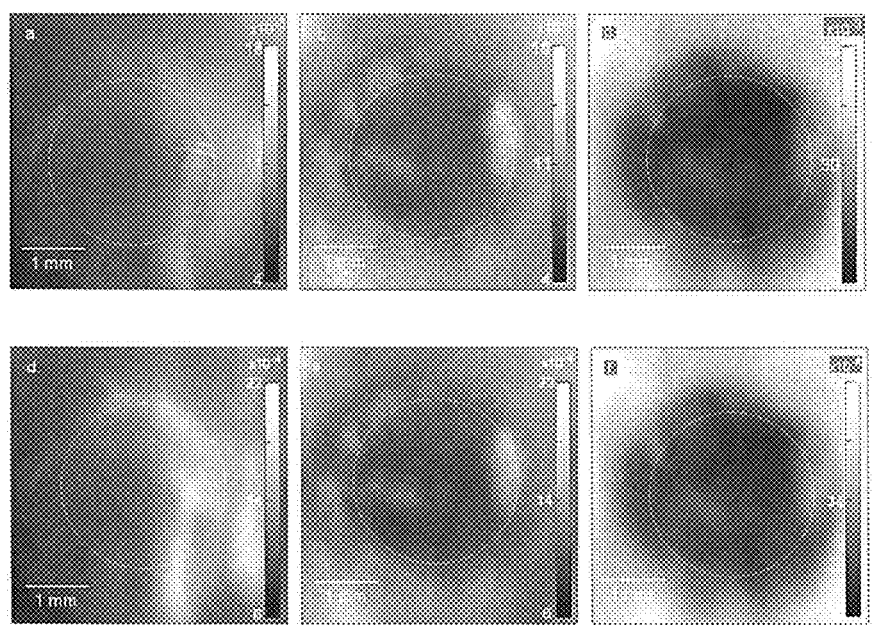
FIGS. 8(a)-(c) shows temporal noise maps for 3 light sources, over a 256 frame trial. The pixel-wise (standard deviation/mean) over all frames was calculated in each case.
FIGS. 8(d)-(f) show the same analysis repeated, on 256 images binned through 64 trials. While the qualitative characteristics remain similar, we see approximately ⅛ the noise values as seen in the initial case.

Many optical imaging studies in live animals improve the noise performance, by trial averaging of the imaging study. The results of trial averaging experiments are shown in FIG. 8. Images (a), (b) and (c) show temporal noise maps calculated for a single trial, under LED, SW and SM illumination schemes respectively. Average pixel noise values are similar to those found in the previous noise analysis, shown in FIG. 7.

In (d), (e) and (f) we show corresponding noise maps after a 64 trial averaging. The maps are qualitatively very similar to the single trial case. However, we see a factor of 8 reduction in the corresponding noise values. This is what we would expect, as random noise reduction generally scales with the square root of number of trials in a repeated set averaging scheme. The reduction shown here brings noise values in both the LED and SW case to a level low enough to detect small stimulated cortical activity signals, on the order of $10^{-4}$ intensity variation.

Optical Neural Imaging

In the previous sections the reduction of noise in a current sweep (SW)-scheme in accordance with the invention is explained, and the potential to use this scheme to create tissue oxygenation maps. As a further example, a single mode (SM) illumination scheme can be used for imaging blood flow. We will show examples for such modalities in this section.

Figure 9:
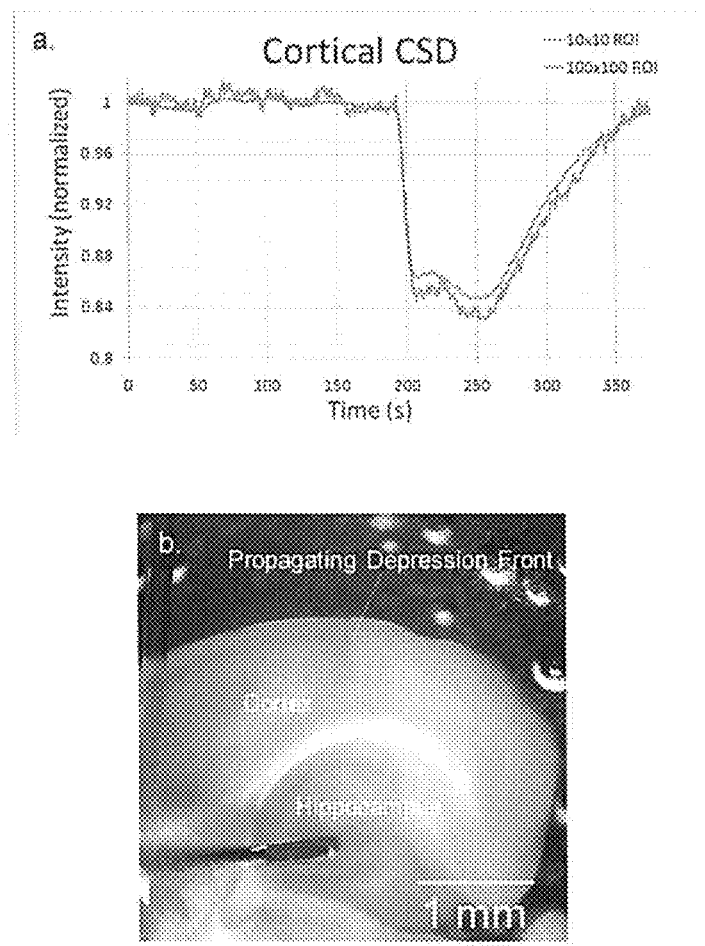
FIGS. 9(a)-9(b) show cortical spreading depression in a mouse brain slice, illuminated by a VCSEL in current sweep.

FIG. 9 shows cortical spreading depression (CSD) propagation in a mouse brain slice. The brain slice is illuminated with a VCSEL in current sweep (SW) scheme and imaged through a low magnification microscope objective (×4). FIG. 9(a) shows a plot of the reflected intensity from a cortical region, demonstrate a clear reflectivity change when the spreading depression wave propagates. FIG. 9(b) shows an image of the brain slice while a spreading depression wave is propagating.

Figure 10:
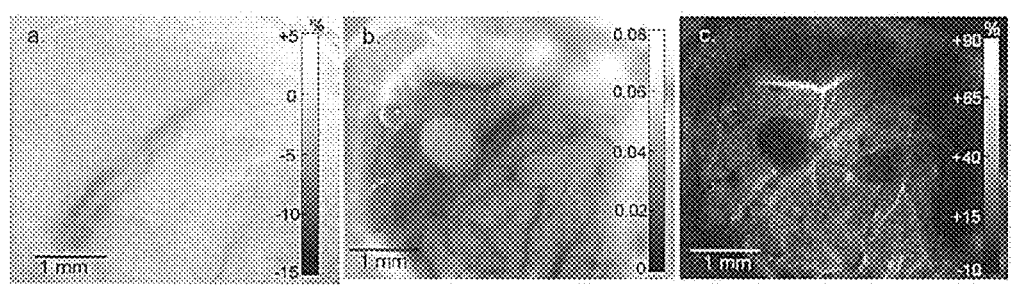
FIGS. 10(a)-10(c) illustrate imaging of ischemia induced changes in oxygenation and in blood flow in a rat brain.

The changes in blood flow and in tissue reflected intensity in a live rat brain, due to an induced ischemia event are shown in FIG. 10. These changes were analyzed, alternating between SM and SW illumination schemes respectively, while imaging with the same CCD camera, to allow co-registration of these images. The changes in flow and tissue reflectivity were caused by inducing a temporary ischemia event in the live rat brain, due to a closing of the right common carotid artery. FIG. 10 (a) shows the relative change in reflected intensity at 670 nm, in SW operation when the effect of the ischemia reached its maximum value, before blood flow in the artery was restored. A small reduction of the reflected intensity signal relative to the baseline values can be observed in the whole tissue, while a larger reduction is observed in the vicinity of the blood vessels. At 670 nm, the main contribution to reflected intensity changes is due to changes in deoxy-Hb concentration. The observed changes are in good agreement with the expected increase of deoxy-Hb due to the ischemia condition and reduction of the available oxygen to the tissue. FIG. 10(b) shows the calculated speckle CR values before the ischemia event, and FIG. 10(c) shows the calculated percent change in CR values when the effect of the ischemia reached its maximum value, respectively, using LCSI technique in SM VCSEL operation. Regions of higher flow, such as large vessels, have lower CR values and appear darker in FIG. 10(b). The increased CR values illustrated in FIG. 10(c) are expected in LCSI technique, since a reduction in cerebral blood flow (CBF) in the vessels will result in reduced flow and in higher CR values as compared to the baseline values shown in FIG. 10(b) before inducing an ischemia. These changes were partially recovered after the tension was removed and blood flow was restored. This data fits well with the expected hemodynamic response in this ischemic animal model. A map of the correlation times $\tau_c$ can be calculated from these CR maps as shown in FIGS. 10(b)-(c), to obtain a relative velocity map in the brain. Using a multi-exposure LCSI technique (MESI) can quantitatively measure blood flow changes, while accounting for static speckle effects as well.

Applications

For example in the case of brain imaging, the present invention enables functional measurements to be made simultaneously for tissue oxygenation and for blood flow measurements, using an illumination method that emphasizes blood vessels and is sensitive to blood flow properties. In addition to tracking tissue properties as blood flow and tissue oxygenation, using laser as an illumination source, enable concurrent measurement of fluorescence from the tissue, and therefore track tissue functional information such as neural activity (for example using voltage sensitive dyes or $Ca^+$ sensitive dyes), tumour margins, tumour metabolism, and response to drug uptake, or to therapy.

In vivo studies for drug response evaluation and pre-clinical trials is greatly influenced by anaesthesia and by taking different measurements in the brain in different times. Therefore, the ability to simplify the measurement while providing functional information about the brain will allow studies in awake animal models, quick location of the heterogeneity of the tissue properties as part of biomedical imaging studies.

The present invention also improves access to imaging for diagnostic and biomedical research purposes, by providing a lower cost alternative to for example MRI system.

In addition, in labs where there is a need to register the (small) field of view in microscopy, providing an easy to use tool that informs about tissue heterogeneity and regions of increased activity in the brain through measurement of oxygenation and flow will greatly simplify their own studies. An example to this is for users who currently use two photon imaging technique for brain studies. The continuous imaging of activity in the brain, using several imaging modalities, allows comparison between two or more chosen imaging techniques, and therefore allows for making "dual measurements", and improves sensitivity and study outcome. It can also be used in other fields as in tissue measurements of fluorescence with "functional optical markers" to emphasize regions in tumour resection and assist-surgeons in their work in the OR.

It should be understood that the present invention provides the ability to measure blood flow and estimate oxygen changes simultaneously, which is a sought after feature. For example, LSCI is a minimally invasive method used to image blood flow in vivo to obtain relative velocities of blood flow with high spatial and temporal resolution utilizing the interference effects of a coherent source. Non-moving scattering particles in the media produce a stable speckle pattern, whereas movement of scattering particles causes phase shifts in the scattered light, and temporal changes in the speckle pattern. In LSCI, time-integrated speckle pattern can be used to estimate blood flow in a tissue. Combining the blood flow and oxygenation information can provide a better estimate of underlying neural activity and cortical dynamics. Providing a portable, head-mounted continuous imaging technique to simultaneously observe blood flow and oxygenation changes in animal brains will offer means for studying the underlying neuronal activity in un-anesthetized animals, and help meet the increased demand for long-term in vivo brain imaging created by the rapid appearance of new stem cell therapies and improved drugs for brain diseases. Furthermore, a continuous imaging modality in a clinical setting could be used to create personalized treatment plans based on up-to-the-minute disease progression and drug efficacy monitoring.

It should be understood that the invention described may be used for other optical imaging implementations such as for example other implementations where it is desirable to monitor the flow of liquid inside for example a conduit, e.g. pipelines, or monitoring liquid emissions on a smokestack.

It should be understood that the imaging system in accordance with the present invention may use arrays of photodiodes and lasers that are relative small (<1 mm), organized in arrays on a semiconductor substrate. The disclosed imaging system may include wireless data communication functionality in order to enable implantation and wireless transfer of captured images.

In one application of the present invention, the optical imaging system disclosed is used for brain imaging to measure neural changes on the cortical surface. Neural activation changes (e.g. hemodynamnics) alter reflectance by changing how light scatters/propagates through tissue. The setup is much smaller than conventional imaging techniques such as MRI or CT.

While illustrative examples of various embodiments of the invention have been described above, it will be appreciated that the above described illustrative examples are not limiting and various alternative embodiments are possible. For example, additional embodiments and background are disclosed in a yet to be published paper entitled "Rapid monitoring of cerebral ischemia dynamics using laser-based optical imaging of blood oxygenation and flow", a copy of which is attached as Appendix A to this specification. Further embodiments and details as described in this paper are hereby incorporated by reference in their entirety.

Thus, in an embodiment, there is provided an optical imaging system comprising: at least one multi-modal, multi-wavelength laser light source; an image capture device; and a controller linked to the at least one multi-modal, multi-wavelength laser light source and the image capture device, the controller being operable to control the at least one multi-modal, multi-wavelength laser light source so as to operate in a multi-modal, multi-wavelength current sweep illumination pattern, and operable to control the image capture device so as to enable the capture of images in multiple modes; wherein the current sweep illumination operation enables the manipulation of coherence effects or speckle noise properties of the captured images.

In another embodiment, there is provided an optical imaging system comprising: at least one laser light source; an image capture device; and a controller linked to the at least one laser light source and the image capture device, the controller being operable to control the at least one laser light source so as to operate in at least two illumination patterns consisting of two or more of: (i) one or more current sweep illumination patterns; (ii) one or more single mode illumination patterns; where the controller is further operable to control the image capture device so as to enable the capture of images based on the multiple illumination patterns to generate multi-modemulti-modal images, wherein the multi-modemulti-modal images enable one or more of (A) reduction, of spatial noise and temporal noise in the captured images, and (B) targeting of different measurements by applying different image analysis methods to sets of captured images depending on their mode.

In another embodiment, there is provided a method of capturing images of a subject, comprising the steps of: initiating a laser light source to illuminate a subject, operating the laser light source in a current sweep illumination pattern, and capturing a series of images illuminated by the laser light source using an image capture device, whereby the resulting images enable the manipulation of coherence effects or noise properties.

In another embodiment, there is provided a method of capturing images of a subject including the steps of: initiating a laser light source to illuminate a subject; operating the laser light source in one or more current sweep illumination patterns, and also optionally in one or more single mode illumination patterns, and alternating between the illumination patterns rapidly; capturing images of the subject in the illumination patterns so as to generate a number of sets of images corresponding to the number of different illumination patterns; and processing the sets of images to generate a set of output images, including by incorporating into the output images selected aspects of the different sets of images, including whereby the output images have reduced spatial and temporal noise characteristics.

In another embodiment, the method further comprises the further step of analyzing the sets of images using one or more image processing routines or algorithms so as to generate the output images.

The scope of the invention is defined by the following claims.

The invention claimed is:

1. An optical imaging system comprising:
 (a) at least one multi-modal, multi-wavelength laser light source including at least a given laser light source configured to produce different illumination patterns based on a current level provided to the given laser light source;
 (b) an image capture device; and
 (c) a controller linked to the at least one multi-modal, multi-wavelength laser light source and the image capture device, the controller configured to control a coherence property of at least the given laser light source by varying the current level provided to at least the given laser light source to shift between the different illumination patterns, so as to produce a current sweep illumination pattern, and control the image capture device to capture images as the current level is varied;

wherein varying the current level provided to at least the given laser light source to produce the current sweep illumination pattern enables the control of one or more of coherence effects and speckle noise properties of the captured images.

2. The optical imaging system of claim 1, wherein the given laser light source is a vertical cavity surface emitting laser (VCSEL), the controller configured to control the VCSEL in a multi-modal, multi-wavelength current sweep illumination pattern in both Intrinsic Optical Signal Imaging (IOSI) and Laser Speckle Contrast Imaging (LSCI) modes.

3. The optical imaging system of claim 2, wherein the coherence property comprises a coherence length of the VCSEL in both IOSI and LSCI modes.

4. The optical imaging system of claim 3, wherein the controller is further configured to control the image capture device so as to enable the simultaneous capture of images in IOSI and LSCI modes.

5. The optical imaging system of claim 4, wherein the controller is further configured to process the captured images in IOSI and LSCI modes to reduce speckle noise by averaging superimposed speckles from a plurality of captured images.

6. The optical imaging system of claim 4, wherein the controller is further configured to control the VCSEL and the image capture device to continuously monitor cortical hemodynamics or cortical ischemia.

7. The optical imaging system of claim 4, wherein the controller is further configured to control the VCSEL and the image capture device to continuously monitor oxygenation and establish flow velocities in veins.

8. The optical imaging system of claim 7, wherein the controller is further configured to control the VCSEL and the image capture device to statistically distinguish between arteries and veins.

9. The optical imaging system of claim 2, wherein the VCSEL and the optical imaging system are adapted to be portable, thereby to enable continuous monitoring of free moving subjects.

10. A method of capturing optical images of a subject, comprising:

controlling a coherence property of a laser light source configured to generate different illumination patterns based on a current level provided to the given laser light source, wherein controlling the coherence property of the given laser comprises:

varying the current level provided to the laser light source to shift between the different illumination patterns, so as to produce a current sweep illumination pattern, and controlling the image capture device to capture images as the current level is varied;

wherein varying the current level provided to the given laser light source to produce the current sweep illumination pattern enables the control of one or more of coherence effects and speckle noise properties of the captured images.

11. The method of claim 10, wherein the laser light source is a vertical cavity surface emitting laser (VCSEL), and the method further comprises controlling the VCSEL in a multi-modal, multi-wavelength, current sweep illumination pattern in both Intrinsic Optical Signal Imaging (IOSI) and Laser Speckle Contrast Imaging (LSCI) modes.

12. The method of claim 11, wherein the coherence property comprises a coherence length of the VCSEL in both IOSI and LSCI modes.

13. The method of claim 12, wherein the method further comprises controlling the image capture device so as to enable the simultaneous capture of images in IOSI and LSCI modes.

14. The method of claim 13, wherein the method further comprises processing the captured images in IOSI and LSCI modes to reduce speckle noise by averaging superimposed speckles from a plurality of captured images.

15. The method of claim 13, wherein the method further comprises controlling the VCSEL and the image capture device to continuously monitor cortical hemodynamics or cortical ischemia.

16. The method of claim 13, wherein the method further comprises controlling the VCSEL and the image capture device to continuously monitor oxygenation and establish flow velocities in veins.

17. The method of claim 16, wherein the method further comprises controlling the VCSEL and the image capture device to statistically distinguish between arteries and veins.

18. An optical imaging system comprising:

(a) at least one vertical cavity surface emitting laser (VCSEL) light source including at least a given laser light source configured to generate different illumination patterns based on a current level provided to the at least one VCSEL light source;

(b) an image capture device; and (c) a controller linked to the at least one vertical cavity surface emitting laser (VCSEL) light source and the image capture device, the controller configured to control a coherence length of at least the given laser light source by varying the current level provided to at least the given laser light source to shift between the different illumination patterns, so as to produce a current sweep illumination pattern in both Intrinsic Optical Signal Imaging (IOSI) and Laser Speckle Contrast Imaging (LSCI) modes, and the controller further configured to control the image capture device to capture images in multiple modes.

19. The optical imaging system of claim 1, wherein the controller is configured to vary the current level provided to at least the given laser light source to switch between operating in:

a current sweep mode in which the current level provided to at least the given laser light source is varied to shift between the different illumination patterns; and one or more single illumination modes in which the current level provided to at least the given laser light source is constant to produce a single illumination pattern.

20. The method of claim 10 comprising varying the current level provided to the laser light source to switch between operating in:

a current sweep mode in which the current level provided to at least the given laser light source is varied to shift between the different illumination patterns; and one or more single illumination modes in which the current level provided to the laser light source is constant to produce a single illumination pattern.

* * * * *